United States Patent
Mieno et al.

(10) Patent No.: US 11,757,856 B2
(45) Date of Patent: Sep. 12, 2023

(54) CRYPTOGRAPHIC COMMUNICATION SYSTEM, CRYPTOGRAPHIC COMMUNICATION METHOD, AND CRYPTOGRAPHIC COMMUNICATION APPARATUS

(71) Applicants: SEIKO EPSON CORPORATION, Tokyo (JP); Shinshu University, Nagano (JP)

(72) Inventors: Takehiko Mieno, Naganoken Azuminoshi (JP); Hiroyuki Okazaki, Naganoken Naganoshi (JP)

(73) Assignees: SEIKO EPSON CORPORATION, Tokyo (JP); Shinshu University, Nagano (JP)

( * ) Notice: Subject to any disclaimer, the term of this patent is extended or adjusted under 35 U.S.C. 154(b) by 47 days.

(21) Appl. No.: 17/546,012

(22) Filed: Dec. 8, 2021

(65) Prior Publication Data
US 2022/0182367 A1 Jun. 9, 2022

(30) Foreign Application Priority Data
Dec. 9, 2020 (JP) .................. 2020-204371

(51) Int. Cl.
*H04L 29/06* (2006.01)
*H04L 9/40* (2022.01)
(Continued)

(52) U.S. Cl.
CPC .......... *H04L 63/061* (2013.01); *H04L 9/0838* (2013.01); *H04L 9/0861* (2013.01); *H04L 9/32* (2013.01); *H04L 63/0435* (2013.01)

(58) Field of Classification Search
None
See application file for complete search history.

(56) References Cited

U.S. PATENT DOCUMENTS 8,316,237 B1 * 11/2012 Felsher ................. H04L 9/3249
380/282
10,326,803 B1 * 6/2019 Haney .................... H04L 63/30
(Continued)

FOREIGN PATENT DOCUMENTS

| CN | 104303450 | 1/2015 |
|---|---|---|
| JP | 2012227672 | 11/2012 |
| JP | 2019208142 | 12/2019 |

OTHER PUBLICATIONS

Zhang, Jiliang; Qu, Gang. Physical Unclonable Function-Based Key Sharing via Machine Learning for IoT Security. IEEE Transactions on Industrial Electronics, vol. 67, Issue 8. https://ieeexplore.ieee.org/stamp/stamp.jsp?tp=&arnumber=8825835 (Year: 2020).*

(Continued)

*Primary Examiner* — Jeremiah L Avery
(74) *Attorney, Agent, or Firm* — JCIPRNET

(57) ABSTRACT

A cryptographic communication system includes: a first cryptographic communication apparatus including a first tamper-resistant device configured to store a first key generation function and a first storage unit configured to store first individual information; and a second cryptographic communication apparatus including a second tamper-resistant device configured to store a second key generation function and a second storage unit configured to store second individual information. The first cryptographic communication apparatus generates a twelfth shared key using the first key generation function and the second individual information. The second cryptographic communication apparatus generates a twenty first shared key using the second key generation function and the first individual information.

6 Claims, 6 Drawing Sheets

(51) Int. Cl.
*H04L 9/32* (2006.01)
*H04L 9/08* (2006.01)

(56) References Cited

U.S. PATENT DOCUMENTS

| | | | | |
|---|---|---|---|---|
| 10,742,422 | B1* | 8/2020 | Jarjoui | G06Q 20/3825 |
| 2002/0199001 | A1* | 12/2002 | Wenocur | H04L 69/329 |
| | | | | 709/227 |
| 2005/0195975 | A1* | 9/2005 | Kawakita | H04L 9/3236 |
| | | | | 380/30 |
| 2015/0134960 | A1 | 5/2015 | Garcia Morchon et al. | |
| 2016/0254909 | A1 | 9/2016 | Garcia Morchon et al. | |
| 2018/0191501 | A1* | 7/2018 | Lindemann | H04L 9/0833 |
| 2018/0337782 | A1* | 11/2018 | Wu | H04L 63/06 |
| 2020/0153627 | A1* | 5/2020 | Wentz | H04L 9/3239 |
| 2021/0211275 | A1 | 7/2021 | Nagai et al. | |

OTHER PUBLICATIONS

Kuchipudi, Ramu et al. An efficient hybrid dynamic key distribution in Wireless Sensor Networks with reduced memory overhead. 2016 International Conference on Electrical, Electronics, and Optimization Techniques (ICEEOT). https://ieeexplore.ieee.org/stamp/stamp.jsp?tp=&arnumber=7755256 (Year: 2016).*

Hsu, Chien-Lung; Lin, Tzu-Wei. Privacy-Preserved Key Agreement with User Authentication. 2015 10th Asia Joint Conference on Information Security. https://ieeexplore.ieee.org/stamp/stamp.jsp?tp=&arnumber=7153849 (Year: 2015).*

\* cited by examiner

CRYPTOGRAPHIC COMMUNICATION SYSTEM, CRYPTOGRAPHIC COMMUNICATION METHOD, AND CRYPTOGRAPHIC COMMUNICATION APPARATUS

The present application is based on, and claims priority from JP Application Serial Number 2020-204371, filed Dec. 9, 2020, the disclosure of which is hereby incorporated by reference herein in its entirety.

BACKGROUND

1. Technical Field

The present disclosure relates to a cryptographic communication system, a cryptographic communication method, and a cryptographic communication apparatus.

2. Related Art

In the vehicle-to-vehicle/road-to-vehicle communication system described in JP-A-2012-227672, a roadside machine and an on-vehicle machine present in an area communicate with each other using a same shared key. In addition, in this system, the roadside machine acquires a shared key for the area to which the roadside machine belongs and neighboring areas from a key management server, and distributes the key to on-vehicle machines available for communication. This system is a cryptographic communication system that includes a key management server and a roadside machine (see JP-A-2012-227672).

However, the system described in JP-A-2012-227672 enhances security by increasing the amount of data and making encryption complex as a countermeasure against impersonation by third parties. Here, the level of security and the amount of data are in a trade-off relationship. Thus, an increase in the amount of data makes the cryptographic communication system bigger. Thus, there have been cases where it is difficult to achieve a simple cryptographic communication system and high security at the same time.

To address such issues, as a configuration that has high security and requires no external apparatuses such as a key management server, a configuration is contemplated in which all devices include individual information and the same number of keys (or keyrings) as the number of communication targets. However, a configuration in which all devices include the same number of keys (or keyrings) as the number of communication targets is not realistic for reasons such as the impossibility to increase communication counterparties at a later date and enormity of the amount of data for key generation functions.

SUMMARY

To solve the above-described problems, one aspect is a cryptographic communication system including: a first cryptographic communication apparatus including a first tamper-resistant device that stores a first key generation function, and a first storage unit that stores a first individual information, and a second cryptographic communication apparatus including a second tamper-resistant device that stores a second key generation function, and a second storage unit that stores a second individual information, wherein the first cryptographic communication apparatus generates a first shared key using the first key generation function and the second individual information, and the second cryptographic communication apparatus generates a second shared key using the second key generation function and the first individual information.

To solve the above-described problems, one aspect is a cryptographic communication method by a first cryptographic communication apparatus and a second cryptographic communication apparatus, the first cryptographic communication apparatus that includes a first tamper-resistant device storing a first key generation function and a first storage unit storing a first individual information, the second cryptographic communication apparatus that includes a second tamper-resistant device storing a second key generation function and a second storage unit storing a second individual information, the cryptographic communication method comprising: generating a first shared key using the first key generation function and the second individual information and generating a second shared key using the second key generation function and the first individual information.

To solve the above-described problems, one aspect is a cryptographic communication apparatus comprising a first tamper-resistant device that stores a first key generation function and a first storage unit that stores a first individual information, the cryptographic communication apparatus acquiring, from another cryptographic communication apparatus including a second tamper-resistant device that stores a second key generation function and a second storage unit that stores a second individual information, the second individual information, and the cryptographic communication apparatus generating a shared key using the second individual information and the first key generation function.

DESCRIPTION OF EXEMPLARY EMBODIMENTS

Hereinafter, embodiments will be described with reference to the accompanying drawings.

Figure 1:
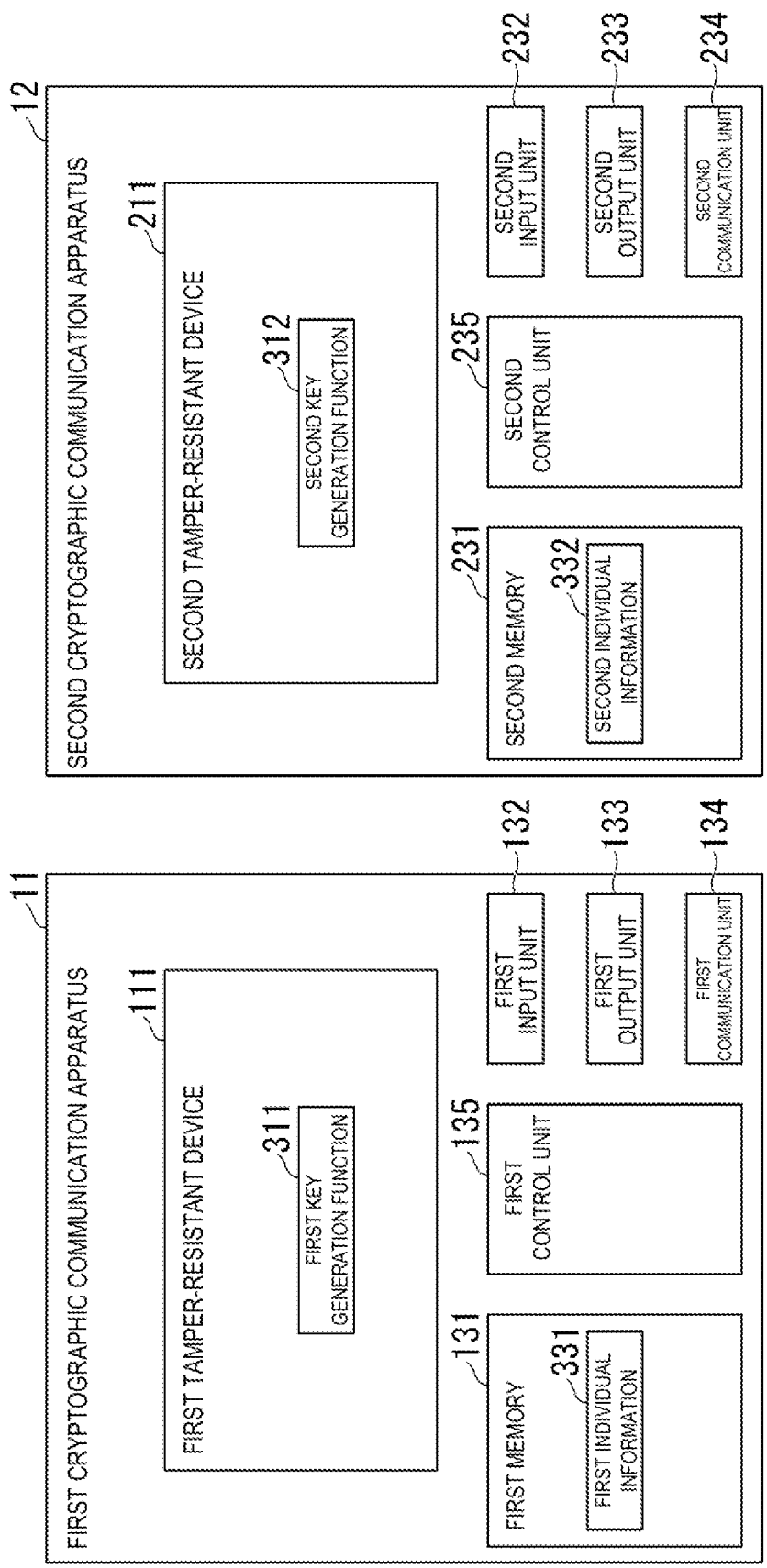
FIG. 1 is a diagram illustrating a schematic configuration example of a cryptographic communication system.

FIG. 1 is a diagram illustrating a schematic configuration example of a cryptographic communication system 1.

The cryptographic communication system 1 includes a first cryptographic communication apparatus 11 and a second cryptographic communication apparatus 12.

The first cryptographic communication apparatus 11 includes a first tamper-resistant device 111, a first memory 131, a first input unit 132, a first output unit 133, a first communication unit 134, and a first control unit 135.

A first key generation function 311 is stored in the first tamper-resistant device 111. The first key generation function 311 may be embedded in the first tamper-resistant device 111 during manufacturing. The first tamper-resistant device 111 may be an Internet of Things (IoT) device.

First individual information 331 is stored in the first memory 131.

The first memory 131 is an example of a first storage unit.

The second cryptographic communication apparatus 12 includes a second tamper-resistant device 211, a second memory 231, a second input unit 232, a second output unit 233, a second communication unit 234, and a second control unit 235.

A second key generation function 312 is stored in the second tamper-resistant device 211. The second key generation function 312 may be embedded in the second tamper-resistant device 211 during manufacturing. The second tamper-resistant device 211 may be an IoT device.

Second individual information 332 is stored in the second memory 231.

The second memory 231 is an example of a second storage unit.

The first cryptographic communication apparatus 11 will be described.

The first tamper-resistant device 111 has a function to compute shared keys using the first key generation function 311.

The first tamper-resistant device 111 may be detachable from the first cryptographic communication apparatus 11 or may be integrated with the first cryptographic communication apparatus 11. For example, the main body of the first cryptographic communication apparatus 11 may be constituted by using a computer; the first tamper-resistant device 111 may be constituted as a chip; and the first cryptographic communication apparatus 11 may be constituted by inserting the chip into a board of the computer.

The first tamper-resistant device 111 has a countermeasure in place to prevent the first key generation function 311 stored in the first tamper-resistant device 111 from being fraudulently acquired from the outside.

The first memory 131 may also store information other than the first individual information 331.

The first input unit 132 includes an operation unit operated by a first user of the first cryptographic communication apparatus 11, and inputs information in accordance with the content of operation onto the operation unit.

The first output unit 133 outputs information by screen display, audio, and the like.

The first communication unit 134 is a communication interface configured to communicate with the second cryptographic communication apparatus 12. This communication may be a wired communication or a wireless communication.

For wireless communication, near field communication (NFC), which is a type of radio frequency identification (RFID) technology, and the like may be used.

In the present embodiment, a case where the first cryptographic communication apparatus 11 and the second cryptographic communication apparatus 12 directly communicate with each other is illustrated; however, the first cryptographic communication apparatus 11 and the second cryptographic communication apparatus 12 may indirectly communicate with each other via another apparatus.

The communication channel through which the first communication unit 134 and the second cryptographic communication apparatus 12 communicate with each other is a communication channel that can be wiretapped or intercepted. Thus, cryptographic communication is effective.

The first control unit 135 controls various types of processing.

The first control unit 135 may include a processor such as a central processing unit (CPU), and may execute a control program stored in the first memory 131 to control various types of processing.

In the present embodiment, the first tamper-resistant device 111 has a function to perform computation for encryption and decryption using the first key generation function 311. The first control unit 135 controls the input and output of the first tamper-resistant device 111 to cause the first tamper-resistant device 111 to execute computation.

As another configuration example, the first control unit 135 may execute part of the computation for encryption and decryption so as to realize encryption and decryption in combination with the computation by the first tamper-resistant device 111.

For the first key generation function 311, various key generation functions may be used.

The first key generation function 311 may be a function that generates an ID-based key or may be a function that generates a KPS key.

For the first key generation function 311, in order to reduce the amount of computation, a function that performs no pairing computation may be used, particularly in cases where the first tamper-resistant device 111 has low computation capability. For the first key generation function 311, a function that performs matrix computation may be used.

However, for the first key generation function 311, a function that performs pairing computation may be used.

The first individual information 331 is information that allows the first cryptographic communication apparatus 11 in the cryptographic communication system 1 to be uniquely identified and is information specific to the first cryptographic communication apparatus 11 in the cryptographic communication system 1. The first individual information 331 is made public.

The first individual information 331 may be a variety of information, and may be a serial number of the first cryptographic communication apparatus 11, a MAC address of the first cryptographic communication apparatus 11, a mail address of the first user set in the first cryptographic communication apparatus 11, a name of the first user set in the first cryptographic communication apparatus 11, a national identification number of the first user set in the first cryptographic communication apparatus 11, and the like.

The second cryptographic communication apparatus 12 will be described.

The overview of the configuration and operation of the second cryptographic communication apparatus 12 is similar to the overview of the configuration and operation of the first cryptographic communication apparatus 11.

Specifically, the configuration and operation of the second tamper-resistant device 211, the second memory 231, the second input unit 232, the second output unit 233, the second communication unit 234, and the second control unit 235 in the second cryptographic communication apparatus 12 are similar to the configuration and operation of the first tamper-resistant device 111, the first memory 131, the first input unit 132, the first output unit 133, the first communication unit 134, and the first control unit 135 in the first cryptographic communication apparatus 11, respectively.

The second key generation function 312 is different from the first key generation function 311.

The second individual information 332 is information specific to the second cryptographic communication apparatus 12 in the cryptographic communication system 1.

The second cryptographic communication apparatus 12 is operated by a second user.

The second user may be different from the first user or may be the same person as the first user.

Here, the cryptographic communication system 1 may include another cryptographic communication apparatus other than the first cryptographic communication apparatus 11 and the second cryptographic communication apparatus 12. The configuration and operation of the another cryptographic communication apparatus are also similar to those of the first cryptographic communication apparatus 11 except for the key generation function and individual information, for example.

Figure 2:
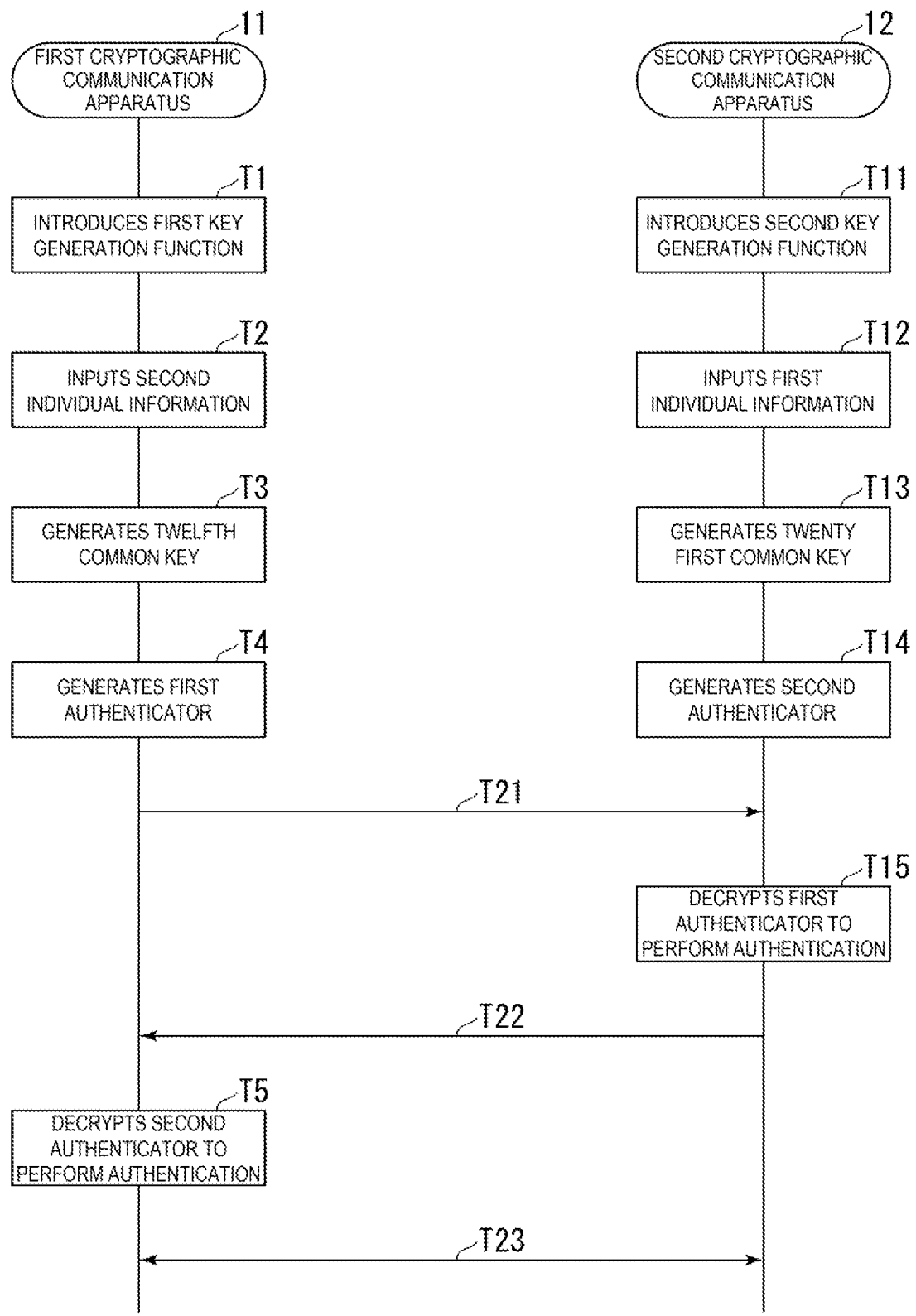
FIG. 2 is a diagram illustrating a flow of processing of the cryptographic communication performed between a first cryptographic communication apparatus and a second cryptographic communication apparatus.

FIG. 2 is a diagram illustrating a flow of processing of the cryptographic communication performed between the first cryptographic communication apparatus 11 and the second cryptographic communication apparatus 12.

Processing T1 to T5 performed in the first cryptographic communication apparatus 11, processing T11 to T15 performed in the second cryptographic communication apparatus 12, and processing T21 to T23 performed by the communication between the first cryptographic communication apparatus 11 and the second cryptographic communication apparatus 12 will be described.

At the processing T1, the first cryptographic communication apparatus 11 introduces the first key generation function 311. This processing is processing in which, when the first tamper-resistant device 111 is detachable with respect to the first cryptographic communication apparatus 11, the first user and the like attaches the first tamper-resistant device 111 to the first cryptographic communication apparatus 11. Thus, when the first tamper-resistant device 111 is already attached to the first cryptographic communication apparatus 11 or when the first tamper-resistant device 111 is integrated with the first cryptographic communication apparatus 11, the processing T1 is omitted.

At the processing T2, the first cryptographic communication apparatus 11 acquires the second individual information 332. In the present example, the first user operates the operation unit for the first input unit 132 so as to cause the first input unit 132 to input the second individual information 332 in accordance with the operation. As a result, the first cryptographic communication apparatus 11 acquires the second individual information 332.

As another example, the second individual information 332 may be acquired by the second communication device 12 transmitting the second individual information 332 to the first cryptographic communication apparatus 11 by the second communication unit 234 and the first cryptographic communication apparatus 11 receiving the second individual information 332 by the first communication unit 134.

At the processing T3, in the first cryptographic communication apparatus 11, the first tamper-resistant device 111 generates a shared key using the first key generation function 311 and the inputted second individual information 332. The shared key is referred to as the twelfth shared key for the purpose of description. In the present example, in the first cryptographic communication apparatus 11, the twelfth shared key is stored in the first memory 131.

At the processing T11, the second cryptographic communication apparatus 12 introduces the second key generation function 312. This processing is similar to the processing T1 for the first cryptographic communication apparatus 11.

At the processing T12, the second cryptographic communication apparatus 12 acquires the first individual information 331. This processing is similar to the processing T2 for the first cryptographic communication apparatus 11.

At the processing T13, in the second cryptographic communication apparatus 12, the second tamper-resistant device 211 generates a shared key using the second key generation function 312 and the inputted first individual information 331. The shared key is referred to as the twenty first shared key for the purpose of description. In the present example, in the second cryptographic communication apparatus 12, the twenty first shared key is stored in the second memory 231.

The twelfth shared key and the twenty first shared key are the same shared keys.

At the processing T4, in the first cryptographic communication apparatus 11, the first tamper-resistant device 111 generates an authenticator using the twelfth shared key and the first individual information 331. The authenticator is referred to as the first authenticator for the purpose of description.

At the processing T14, in the second cryptographic communication apparatus 12, the second tamper-resistant device 211 generates an authenticator using the twenty first shared key and the second individual information 332. The authenticator is referred to as the second authenticator for the purpose of description.

Note that for authenticators, a MAC, which is identification information, may be used; alternatively, other information may be used. Such other information may be data for communicating time information, and the like.

At the processing T21, in the first cryptographic communication apparatus 11, the first authenticator is transmitted to the second cryptographic communication apparatus 12 by the first communication unit 134. In the second cryptographic communication apparatus 12, the first authenticator is received by the second communication unit 234.

At the processing T15, in the second cryptographic communication apparatus 12, the second tamper-resistant device 211 decrypts the received first authenticator using the twenty first shared key and performs authentication based on the decryption result. The present example assumes that, in the second cryptographic communication apparatus 12, the first cryptographic communication apparatus 11 is determined to be a regular apparatus by this authentication. In this case, the following processing T22 is performed.

On the other hand, in a case where, in the second cryptographic communication apparatus 12, the first cryptographic communication apparatus 11 is determined not to be a regular apparatus, predetermined processing such as abnormality notification is executed. In this case, the following processing T22 may not be performed.

At the processing T22, in the second cryptographic communication apparatus 12, the second authenticator is transmitted to the first cryptographic communication apparatus 11 by the second communication unit 234. In the first cryptographic communication apparatus 11, the second authenticator is received by the first communication unit 134.

At the processing T5, in the first cryptographic communication apparatus 11, the first tamper-resistant device 111 decrypts the received second authenticator using the twelfth shared key and performs authentication based on the decryption result.

The present example assumes that, in the first cryptographic communication apparatus 11, the second cryptographic communication apparatus 12 is determined to be a regular apparatus by this authentication. In this case, the following processing T23 is performed.

On the other hand, in a case where, in the first cryptographic communication apparatus 11, the second cryptographic communication apparatus 12 is determined not to be a regular apparatus, predetermined processing such as abnormality notification is executed. In this case, the following processing T23 may not be performed.

At the processing T23, the first cryptographic communication apparatus 11 and the second cryptographic communication apparatus 12 communicate with each other to complete mutual authentication.

Here, a series of the processing T1 to T3 in the first cryptographic communication apparatus 11 and a series of the processing T11 to T13 in the second cryptographic communication apparatus 12 may be performed independently of the subsequent processing T4 and T5, T14 and T15, and T21 to T23.

In addition, a series of the processing T1 to T3 in the first cryptographic communication apparatus 11 and a series of the processing T11 to T13 in the second cryptographic communication apparatus 12 may be performed independently of each other or may be performed in parallel in time.

In addition, the processing T4 in the first cryptographic communication apparatus 11 and the processing T14 in the second cryptographic communication apparatus 12 may be performed independently of each other or may be performed in parallel in time.

In addition, the authentication by the processing T21 and the processing T15 and the authentication by the processing T22 and the processing T5 may be performed in parallel in time. That is, the order of the processing T21, the processing T22, the processing T15, and the processing T5, or the order of the processing T21, the processing T22, the processing T5, and the processing T15 may be used; in addition, the processing T5 and the processing T15 may be performed in parallel in time.

Figure 3:
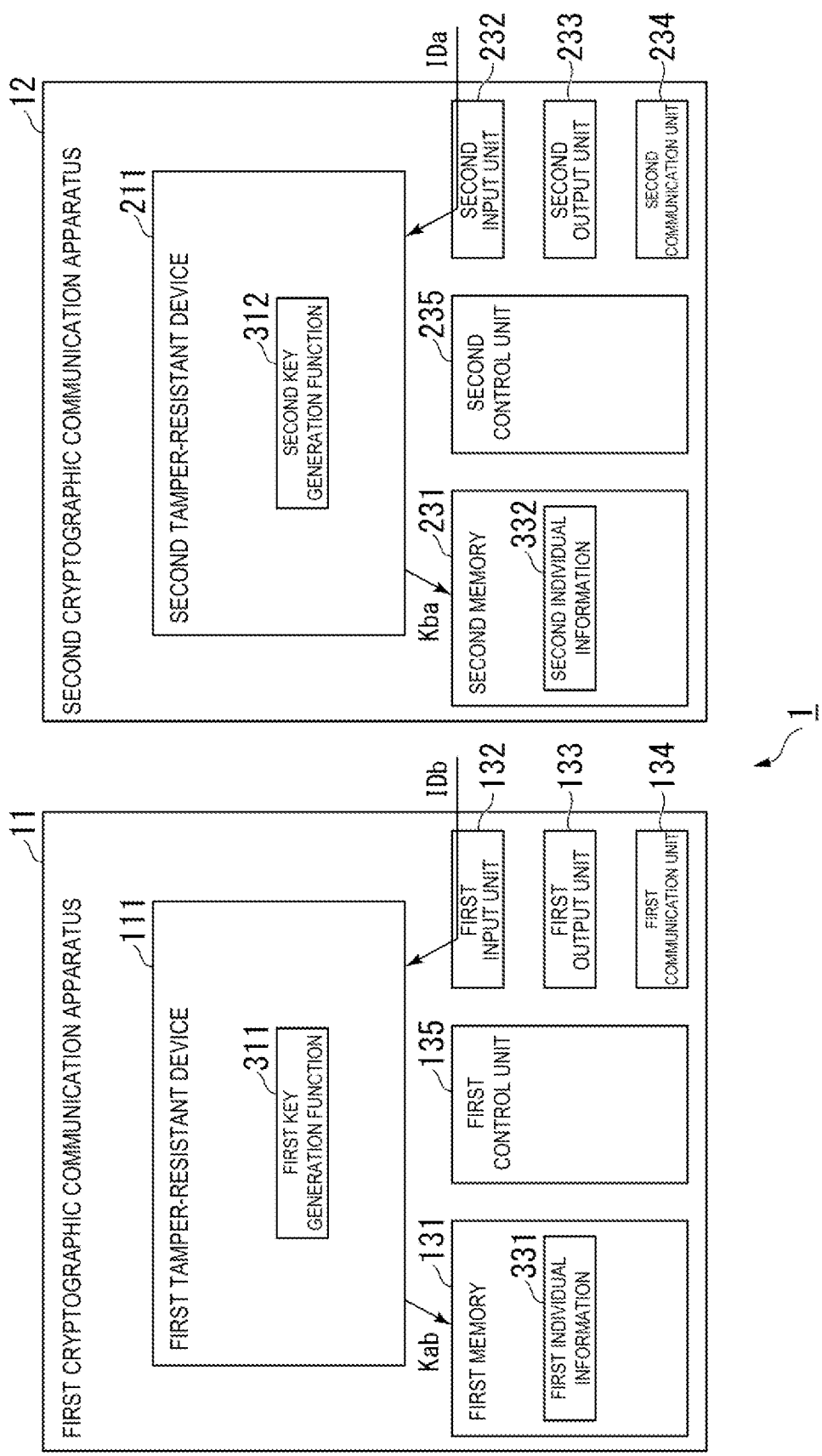
FIG. 3 is a diagram illustrating how a shared key is generated.

FIG. 3 is a diagram illustrating how a shared key is generated.

In the first cryptographic communication apparatus 11, the first tamper-resistant device 111 generates Kab, which is the twelfth shared key, using the first key generation function 311 and IDb, which is the inputted second individual information 332. Here, IDb represents the second individual information 332 and Kab represents the twelfth shared key.

In the second cryptographic communication apparatus 12, the second tamper-resistant device 211 generates Kba, which is the twenty first shared key, using the second key generation function 312 and IDa, which is the inputted first individual information 331. Here, IDa represents the first individual information 331 and Kba represents the twenty first shared key.

Figure 4:
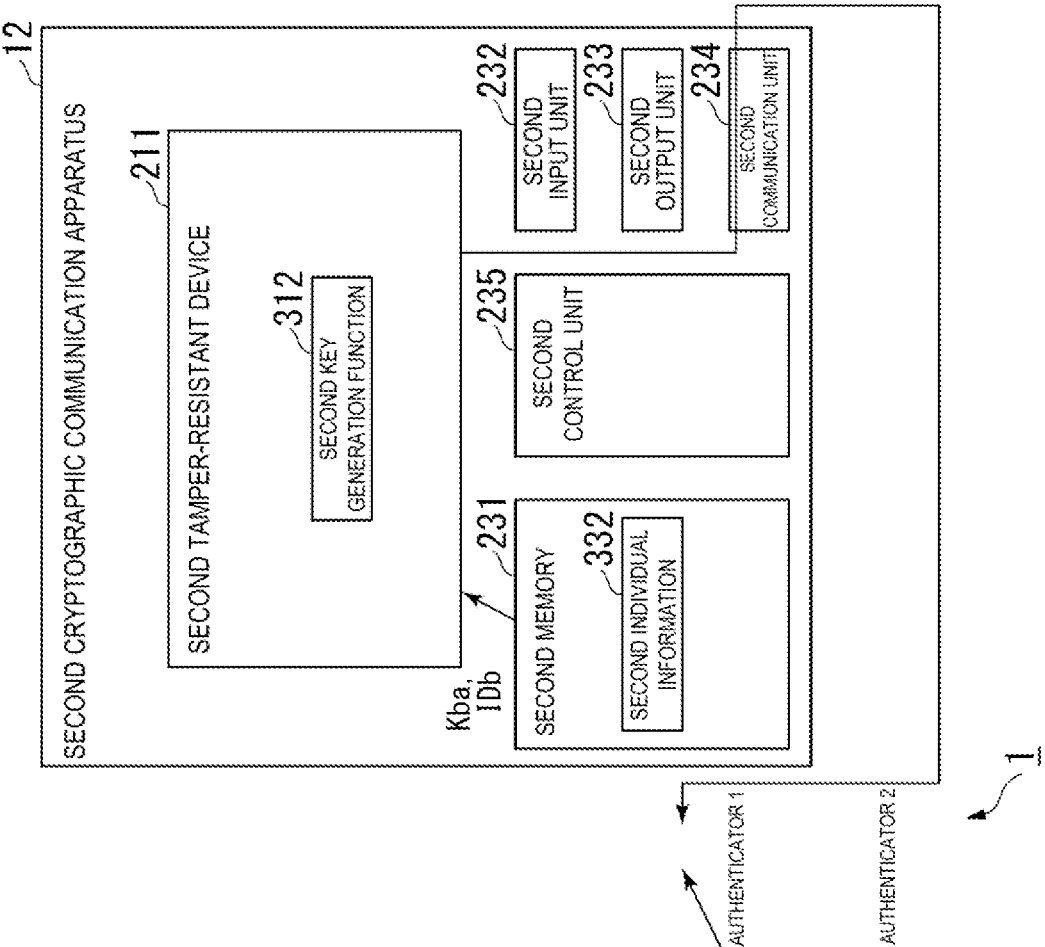
FIG. 4 is a diagram illustrating how an authenticator is generated.
Figure 4:
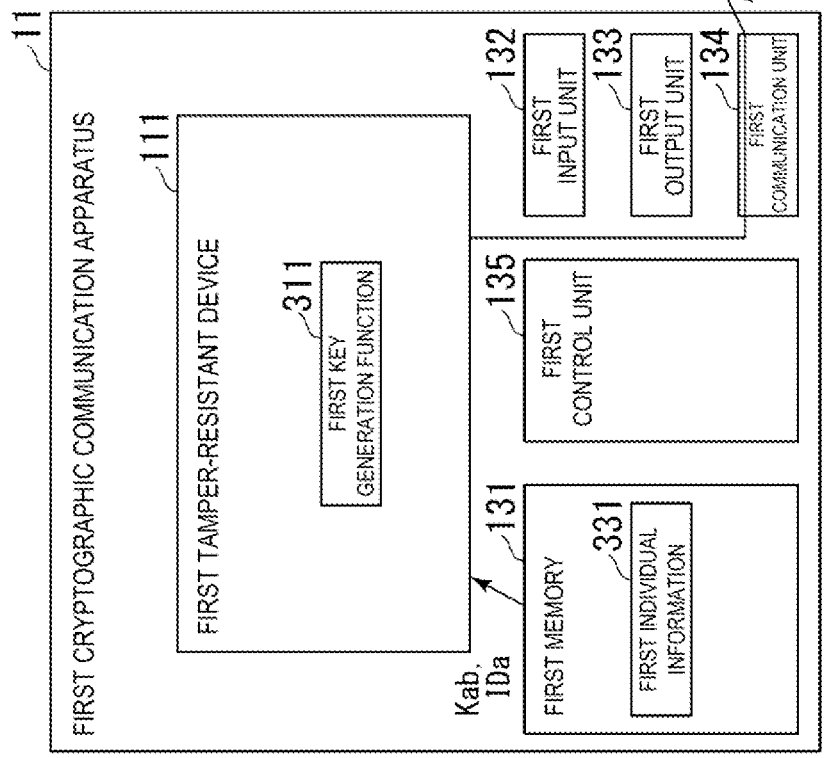

FIG. 4 is a diagram illustrating how an authenticator is generated.

In the first cryptographic communication apparatus 11, the first tamper-resistant device 111 generates an authenticator 1, which is the first authenticator, using Kab, which is the twelfth shared key, and IDa, which is the first individual information 331. Here, the authenticator 1 represents the first authenticator.

In the second cryptographic communication apparatus 12, the second tamper-resistant device 211 generates an authenticator 2, which is the second authenticator, using Kba, which is the twenty first shared key, and IDb, which is the second individual information 332. Here, the authenticator 2 represents the second authenticator.

Figure 5:
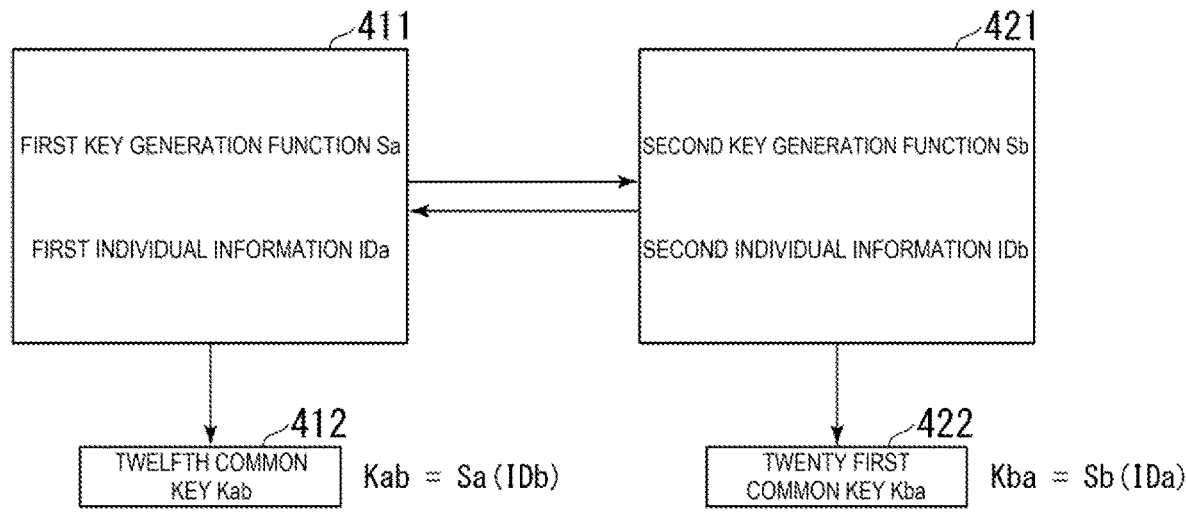
FIG. 5 is a diagram illustrating a shared key generated by a regular apparatus.

FIG. 5 is a diagram illustrating a shared key generated by a regular apparatus.

In the cryptographic communication system 1, the first cryptographic communication apparatus 11 and the second cryptographic communication apparatus 12 are regular apparatuses.

First apparatus information 411 is information retained by the first cryptographic communication apparatus 11 and includes Sa, which is the first key generation function 311, and IDa, which is the first individual information 331. Here, Sa represents the first key generation function 311. As illustrated in FIG. 5, Kab=Sa(IDb), wherein Kab is the twelfth shared key, Sa is the first key generation function 311, and IDb is the second individual information 332.

Second apparatus information 421 is information retained by the second cryptographic communication apparatus 12 and includes Sb, which is the second key generation function 312, and IDb, which is the second individual information 332. Here, Sb represents the second key generation function 312. As illustrated in FIG. 5, Kba=Sb(Ida), wherein Kba is the twenty first shared key, Sb is the second key generation function 312, and IDa is the first individual information 331.

In the example of FIG. 5, the first cryptographic communication apparatus 11 and the second cryptographic communication apparatus 12 are regular apparatuses and are mutually authenticated.

Figure 6:
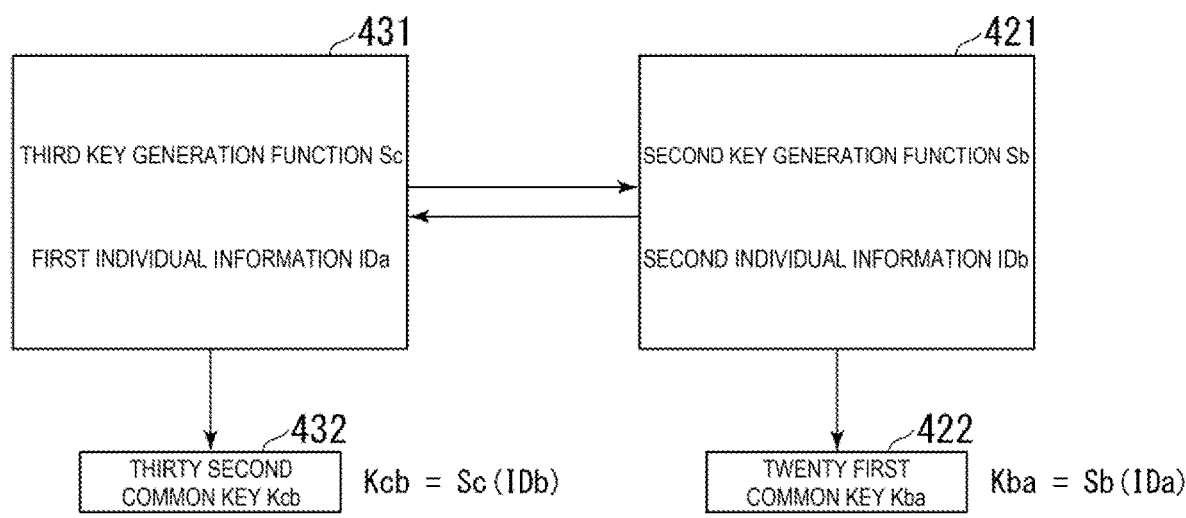
FIG. 6 is a diagram illustrating a shared key generated by a fraudulent apparatus.

FIG. 6 is a diagram illustrating a shared key generated by a fraudulent apparatus.

It is assumed that a third cryptographic communication apparatus, not illustrated, is a fraudulent apparatus in the cryptographic communication system 1. Furthermore, the third cryptographic communication apparatus has acquired and stores the first individual information 331 fraudulently. A case where the fraudulent third cryptographic communication apparatus attempts authentication with the regular second cryptographic communication apparatus 12 will be described.

Third apparatus information 431 is information retained by the third cryptographic communication apparatus and includes Sc, which is a third key generation function, and IDa, which is the first individual information 331. Here, Sc represents the third key generation function.

In the third cryptographic communication apparatus, Kcb, which is a shared key, is generated using Sc, which is the third key generation function, and IDb, which is the inputted second individual information 332. The shared key is referred to as the thirty second shared key for the purpose of description. Here, Kcb represents the thirty second shared key. As illustrated in FIG. 6, Kcb=Sc(IDb), wherein Kcb is the thirty second shared key, Sc is the third key generation function, and IDb is the second individual information 332.

Second apparatus information 421 is information retained by the second cryptographic communication apparatus 12 and includes Sb, which is the second key generation function 312, and IDb, which is the second individual information 332.

The second cryptographic communication apparatus 12 is notified of the first individual information 331 from the third cryptographic communication apparatus. Thus, in the second cryptographic communication apparatus 12, a twenty first shared key is generated. As illustrated in FIG. 6, Kba=Sb(Ida), wherein Kba is the twenty first shared key, Sb is the second key generation function 312, and IDa is the first individual information 331.

In this case, the thirty second shared key generated in the third cryptographic communication apparatus and the twenty first shared key generated in the second cryptographic communication apparatus 12 are different shared keys. Thus, in the second cryptographic communication apparatus 12, the third cryptographic communication apparatus is determined not to be a regular apparatus.

In this way, in the example of FIG. 6, the third cryptographic communication apparatus is a fraudulent apparatus, and no mutual authentication is established between the third cryptographic communication apparatus and the second cryptographic communication apparatus 12.

Here, a case where the first individual information is fraudulently stored in the third cryptographic communication apparatus has been illustrated. However, the same applies to a case where a fraudulent third user operating the third cryptographic communication apparatus causes the second cryptographic communication apparatus 12 to input the first individual information.

In this way, in the cryptographic communication system 1, even if the first individual information 331 of the first cryptographic communication apparatus 11 and the second individual information 332 of the second cryptographic communication apparatus 12 are known to a third party, so-called impersonation can be prevented.

The cryptographic communication system 1 is resistant to impersonation attacks because the first key generation function 311 is stored in the first tamper-resistant device 111 of the first cryptographic communication apparatus 11 prior to the time of cryptographic communication, and the second key generation function 312 is stored in the second tamper-resistant device 211 of the second cryptographic communication apparatus 12 prior to the time of cryptographic communication.

Figure 7:
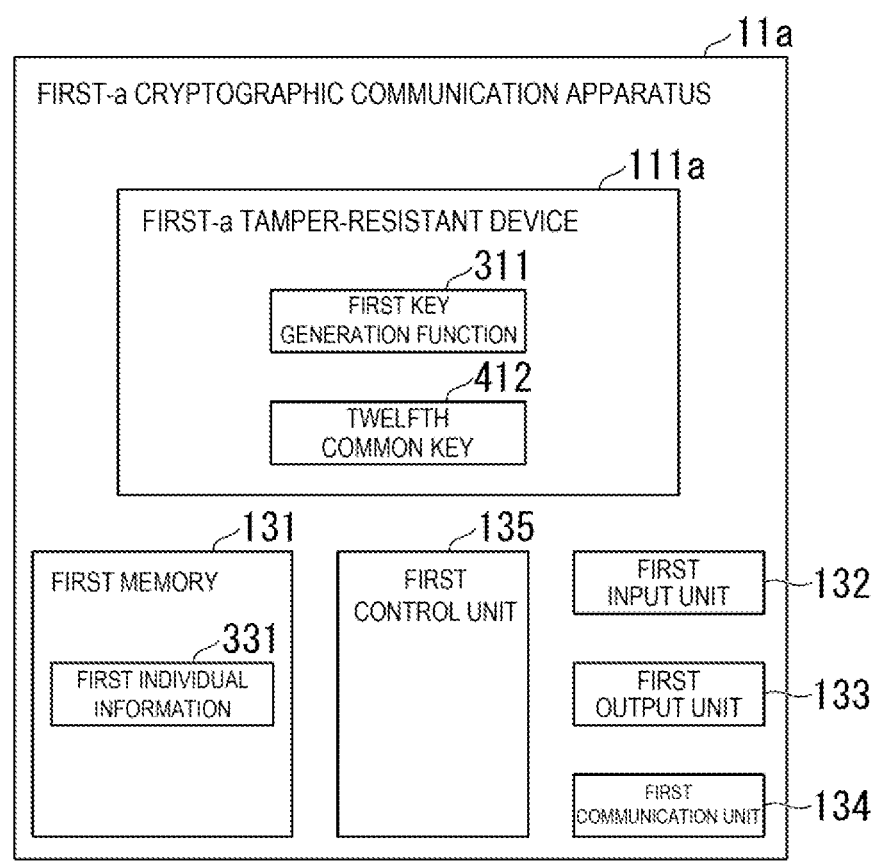
FIG. 7 is a diagram illustrating a first-a cryptographic communication apparatus according to a modified example.

FIG. 7 is a diagram illustrating a first-a cryptographic communication apparatus 11a according to a modified example.

The first-a cryptographic communication apparatus 11a is a modified example of the first cryptographic communication apparatus 11 illustrated in FIG. 1. Components similar to those in FIG. 1 are given the same reference signs, so detailed descriptions thereof will be omitted.

Schematically, in the first-a cryptographic communication apparatus 11a, a first-a tamper-resistant device 111a, which is a modified example of the first tamper-resistant device 111, has a different function compared to the first cryptographic communication apparatus 11 illustrated in FIG. 1.

In the first-a cryptographic communication apparatus 11a, the first-a tamper-resistant device 111a stores a generated twelfth shared key 412. As a result, in the first-a cryptographic communication apparatus 11a, the twelfth shared key 412 is not readable from the outside. As a result, the first-a cryptographic communication apparatus 11a can further enhance safety of cryptographic communication.

In addition, as yet another modified example, the first-a tamper-resistant device 111a may include, as a control unit for generating the twelfth shared key 412, a control unit having a function similar to that of the first control unit 135. As a result, the twelfth shared key 412 can be generated in the first-a tamper-resistant device 111a. Therefore, the first-a cryptographic communication apparatus 11a can further enhance safety of cryptographic communication. Note that in this configuration, the first-a cryptographic communication apparatus 11a need not include the first control unit 135, and may include an optional control unit separate from the control unit of the first-a tamper-resistant device 111a.

Here, the first-a cryptographic communication apparatus 11a according to the above-described modified example has been described; however, a similar modified example may also be implemented for the second cryptographic communication apparatus 12 illustrated in FIG. 1.

The first cryptographic communication apparatus 11 according to the present embodiment includes the first input unit 132 and the first output unit 133. As another configuration example, however, in a case where the functions of one or both of the first input unit 132 and the first output unit 133 are not used, one or both of the unused first input unit 132 and first output unit 133 need not be included.

Here, the first cryptographic communication apparatus 11 has been described; however, the same applies to the second cryptographic communication apparatus 12.

The first cryptographic communication apparatus 11 and the second cryptographic communication apparatus 12 according to the present embodiment perform mutual authentication using the first authenticator and the second authenticator; for other authentication methods, however, a general authentication scheme may be used. For example, the first cryptographic communication apparatus 11 and the second cryptographic communication apparatus 12 may authenticate by authentication schemes such as a challenge and response scheme.

The first cryptographic communication apparatus 11 and the second cryptographic communication apparatus 12 according to the present embodiment perform mutual authentication using the first authenticator and the second authenticator; however, the first cryptographic communication apparatus 11 and the second cryptographic communication apparatus 12 need not be mutually authenticated.

In this case, the first cryptographic communication apparatus 11 decrypts ciphertexts transmitted from the second cryptographic communication apparatus 12 using the twelfth shared key, which is generated based on the first key generation function 311 and the second individual information 332. As a result, the first cryptographic communication apparatus 11 can decrypt ciphertexts transmitted from the second cryptographic communication apparatus 12. Therefore, the first cryptographic communication apparatus 11 can indirectly recognize that the communication counterparty is the second cryptographic communication apparatus 12.

On the other hand, in a case where the communication counterparty of the first cryptographic communication apparatus 11 is a cryptographic communication apparatus impersonating as the second cryptographic communication apparatus 12, the first cryptographic communication apparatus 11 cannot decrypt ciphertexts transmitted from the impersonating cryptographic communication apparatus. Therefore, the first cryptographic communication apparatus 11 can retain confidentiality in cryptographic communication without authenticating the second cryptographic communication apparatus 12.

Here, the first cryptographic communication apparatus 11 has been described; however, the same applies to the second cryptographic communication apparatus 12.

As described above, in the cryptographic communication system 1 according to the present embodiment, the first cryptographic communication apparatus 11 includes the first individual information 331 and the first key generation function 311 that is protected by the first tamper-resistant device 111. Similarly, the second cryptographic communication apparatus 12 includes the second individual information 332 and the second key generation function 312 that is protected by the second tamper-resistant device 211.

The first cryptographic communication apparatus 11 generates the twelfth shared key from the first key generation function 311 and the second individual information 332 of the second cryptographic communication apparatus 12 at the other end. Similarly, the second cryptographic communication apparatus 12 generates the twenty first shared key from the second key generation function 312 and the first individual information 331 of the first cryptographic communication apparatus 11 at the other end. In this way, the first cryptographic communication apparatus 11 and the second cryptographic communication apparatus 12 separately generate shared keys.

In this configuration, the first cryptographic communication apparatus 11 and the second cryptographic communication apparatus 12 generate a shared key using their own key generation function and the counterparty's individual information. Thus, even if the individual information of one of the cryptographic communication apparatuses is leaked to a third party and used in a third cryptographic communication apparatus, the shared key generated by the third cryptographic communication apparatus will be a different shared key than the regular shared key. Accordingly, the cryptographic communication system 1 makes it possible not only to realize a simple cryptographic communication system but also to reduce the risk of impersonation even if the individual information of one of the cryptographic communication apparatuses is leaked to a third party.

Because the first cryptographic communication apparatus 11 and the second cryptographic communication apparatus 12 generate a shared key using the counterparty's individual information, the need for a delegated calculating apparatus, which is necessary when generating a shared key using a public key, is eliminated. As a result, cryptographic communication apparatuses can be simplified.

In the cryptographic communication system 1, a key sharing scheme that requires no preliminary communication allows the first cryptographic communication apparatus 11 and the second cryptographic communication apparatus 12 to directly and simply perform mutual authentication procedures. In the cryptographic communication system 1, when the first cryptographic communication apparatus 11 and the second cryptographic communication apparatus 12 directly perform cryptographic communication, the need for network environment at the time of authentication may be eliminated.

In this way, the cryptographic communication system 1 according to the present embodiment utilizes an ID-based technology and the like as one of the lightweight cryptographic technologies that need substantially no processing performance. This allows for highly safe, authenticated key sharing while preventing processing time efficiency from decreasing regardless of the processing performance of the appliances.

Here, specific examples of advantages of the cryptographic communication system 1 according to the present embodiment will be described while illustrating problems in traditional technologies.

Traditionally, key sharing systems in which a shared key for performing cryptographic communication between appliances is generated by an authenticated key sharing protocol have been known. In such key sharing systems, pairing computation is mainly used to generate highly safe shared keys while preventing processing time efficiency from decreasing regardless of the processing performance of the appliances; and each appliance delegates computation processing related to the private key to a delegated calculating apparatus so as to realize key generation, key sharing and authentication through cryptographic communication.

For example, for approaches to solve the problems in management and key delivery of private keys, ID-based approaches used in mail systems and the like have been traditionally known. For example, in the fourth generation key sharing scheme in which an ID is divided, a plurality of key issuing centers are installed to solve the problem of Big Brother, further allowing parameters to be flexibly set while taking into consideration high speed performance, required memory, collusion threshold, and the like depending on the system environment.

However, traditional mutual authentication methods between IoT devices are specific authentications, in which a specific master key is required, and the counterparty to be authenticated is fixed, so no authentication between IoT devices is possible.

In contrast, in the cryptographic communication system 1 according to the present embodiment, authentication between the first cryptographic communication apparatus 11 and the second cryptographic communication apparatus 12 is possible. As a result, for example, authentication between IoT devices is made possible.

Traditionally, public key cryptosystem technologies that use pairing computation have heavy computation processing loads and require devices having high processing capability; thus, there have been cases where public key cryptosystem technologies that use pairing computation are unsuitable for IoT devices that do not have high processing capability. With such technologies, for example, it has been necessary that a delegated calculating apparatus having a certain level of computation processing performance or higher be provided on the Internet.

In contrast, because it adopts a key generation function that uses no pairing computation, the cryptographic communication system 1 according to the present embodiment is suitable for IoT devices that do not have high processing capability, and can make it easier to ensure real-time performance. In addition, the cryptographic communication system 1 according to the present embodiment can eliminate the need to provide a key issuing center or a delegated calculating apparatus. Note that in the cryptographic communication system 1 according to the present embodiment, a key generation function that uses pairing computation may be used.

There have been cases where traditional ID-based or KPS cryptographic technologies are not safe enough because there exists the problem of collision. The problem of collision is a problem in which, when the same number of users as the number of elements in a public key share their private keys with one another, the master key, which is the private key of the private key generator (PKG), is revealed.

In contrast, the cryptographic communication system 1 according to the present embodiment can enhance resistance to the problem of collision and enhance safety.

Traditionally, there have been cases where a configuration in which all devices include the same number of keys as the number of communication targets is not realistic because it makes key management difficult for reasons such as the impossibility to increase communication counterparties at a later date and enormity of the amount of data for keys.

In contrast, in the cryptographic communication system 1 according to the present embodiment, key management is easy because the first cryptographic communication apparatus 11 and the second cryptographic communication apparatus 12 are configured to retain their own key generation function and generate a shared key using the counterparty's individual information. In the cryptographic communication system 1 according to the present embodiment, the first cryptographic communication apparatus 11 and the second cryptographic communication apparatus 12 can share a different key with each counterparty without storing a different key for each counterparty. In addition, in the cryptographic communication system 1 according to the present embodiment, it is not necessary to provide a server apparatus or an apparatus having high processing performance such as a delegated calculating apparatus.

An application example for the cryptographic communication system 1 according to the present embodiment will be described.

As for applications after key sharing has made and then mutual authentication has been performed between the first cryptographic communication apparatus 11 and the second cryptographic communication apparatus 12, the cryptographic communication system 1 may be applied to any application. That is, the cryptographic communication system 1 including the first cryptographic communication apparatus 11 and the second cryptographic communication apparatus 12 may be applied to any system that utilizes cryptographic communication.

For example, the cryptographic communication system 1 may be applied to a system in which correctness of time information is verified between IoT devices. As a specific example, the first cryptographic communication apparatus 11 retains internal time information for verifying validity of certificates in cryptographic communication, and when coming under attack such as when external time information acquired from the outside has been tampered with, copes with the attack by determining the external time information to be fraudulent time information.

For example, the cryptographic communication system 1 may be applied to a system for performing vehicle-to-vehicle communication. As a specific example, a first cryptographic communication apparatus 11 of a first automobile can directly mutually authenticate and communicate with a second cryptographic communication apparatus 12 of a second automobile. In addition, the first cryptographic communication apparatus 11 of the first automobile and the second cryptographic communication apparatus 12 of the second automobile can acquire individual information of the counterparty in advance so as to communicate in ciphertext messages in real time.

Configuration examples according to the embodiments will be illustrated.

As one configuration example, the cryptographic communication system 1 includes the first cryptographic communication apparatus 11 including the first tamper-resistant device 111 configured to store the first key generation function 311 and the first storage unit configured to store the first individual information 331, and the second cryptographic communication apparatus 12 including the second tamper-resistant device 211 configured to store the second key generation function 312 and the second storage unit configured to store the second individual information 332.

The first cryptographic communication apparatus 11 generates the twelfth shared key 412 using the first key generation function 311 and the second individual information 332.

The second cryptographic communication apparatus 12 generates the twenty first shared key 422 using the second key generation function 312 and the first individual information 331.

As one configuration example, in the cryptographic communication system 1, the twelfth shared key 412 is stored in the first tamper-resistant device 111 and the twenty first shared key 422 is stored in the second tamper-resistant device 211.

As one configuration example, the first cryptographic communication apparatus 11 generates the first authenticator using the twelfth shared key 412 and the first individual information 331 and transmits the generated first authenticator to the second cryptographic communication apparatus 12. The second cryptographic communication apparatus 12 decrypts the first authenticator received from the first cryptographic communication apparatus 11 using the twenty first shared key 422.

The second cryptographic communication apparatus 12 performs authentication of the first cryptographic communication apparatus 11 based on the decryption result of the first authenticator.

As one configuration example, the second cryptographic communication apparatus 12 generates the second authenticator using the twenty first shared key 422 and the second individual information 332 and transmits the generated second authenticator to the first cryptographic communication apparatus 11. The first cryptographic communication apparatus 11 decrypts the second authenticator received from the second cryptographic communication apparatus 12 using the twelfth shared key 412.

The first cryptographic communication apparatus 11 performs authentication of the second cryptographic communication apparatus 12 based on the decryption result of the second authenticator.

A cryptographic communication method may be implemented.

As one configuration example, in the cryptographic communication method, the first cryptographic communication apparatus 11 including the first tamper-resistant device 111 configured to store the first key generation function 311 and the first storage unit configured to store the first individual information 331 generates the twelfth shared key 412 using the first key generation function 311 and the second individual information 332 of the second cryptographic communication apparatus 12.

The second cryptographic communication apparatus 12 including the second tamper-resistant device 211 configured to store the second key generation function 312 and the second storage unit configured to store the second individual information 332 generates the twenty first shared key 422 using the second key generation function 312 and the first individual information 331.

A cryptographic communication apparatus may be implemented.

As one configuration example, the cryptographic communication apparatus is a cryptographic communication apparatus including the first tamper-resistant device 111 configured to store the first key generation function 311 and the first storage unit configured to store the first individual information 331, the cryptographic communication apparatus acquiring, from the second cryptographic communication apparatus 12 including the second tamper-resistant device 211 configured to store the second key generation function 312 and the second storage unit configured to store the second individual information 332, the second individual information 332, and the cryptographic communication apparatus generating the twelfth shared key 412 using the acquired second individual information 332 and the first key generation function 311.

Here, an example of the cryptographic communication apparatus is the first cryptographic communication apparatus 11 according to embodiments.

A program for realizing the functions of any of the components in any of the apparatuses described above may be recorded in a computer-readable recording medium so that the program may be read into a computer system and executed. The "computer system" herein shall include an operating system or hardware such as peripheral appliances. "Computer-readable recording medium" is a storage apparatus such as a flexible disk, a magneto-optical disk, a read-only memory (ROM), a portable medium such as a compact disc (CD-ROM), and a hard disk drive housed in a computer system. "Computer-readable recording medium" shall also include those that retain a program for a certain period of time, such as a volatile memory within a computer system that serves as a server or a client when a program is transmitted via a network such as the Internet or a communication line such as a telephone line. The volatile memory may be a random-access memory (RAM). The recording medium may be a non-volatile recording medium.

The above-described program may be transmitted from a computer system that has the program stored in a storage apparatus and the like to another computer system via a transmission medium, or by transmission waves in a transmission medium. "Transmission medium" for transmitting a program refers to a medium having a function to transmit information just like a network such as the Internet or a communication line such as a telephone line.

The above-described program may be for realizing some of the aforementioned functions. The above-described program may be an item that can realize the aforementioned functions in combination with a program already recorded in the computer system, or a so-called differential file. The differential file may be called a differential program.

The functions of any of the components in any of the apparatuses described above may be realized by a processor. Each processing in the embodiments may be realized by a processor that operates based on information such as a program, and a computer-readable recording medium that stores information such as a program. For the processor, the functions of each part may be realized in separate hardware, or the functions of each part may be realized in integrated hardware. The processor includes hardware, and the hardware may include at least one of a circuit for processing a digital signal and a circuit for processing an analog signal. The processor may be configured using one or both of one or a plurality of circuit apparatuses and one or a plurality of circuit elements mounted on a circuit board. For circuit apparatuses, an integrated circuit (IC) and the like may be used; for circuit elements, a resistor, a capacitor, and the like may be used.

The processor may be a central processing unit (CPU). However, the processor is not limited to a CPU, and various processors such as a graphics processing unit (GPU) and a digital signal processor (DSP) may be used. The processor may be a hardware circuit based on an application specific integrated circuit (ASIC). The processor may be constituted by a plurality of CPUs or may be constituted by a plurality of ASIC-based hardware circuits. The processor may be constituted by a combination of a plurality of CPUs and a plurality of ASIC-based hardware circuits. The processor may include one or more of an amplifier circuit, a filter circuit, and the like configured to process an analog signal.

The embodiments have been described in detail above with reference to the drawings. However, specific configurations are not limited to these embodiments, and designs and the like that do not depart from the spirit and scope of the present disclosure are also encompassed.

What is claimed is:

1. A cryptographic communication system comprising:
   a first cryptographic communication apparatus including:
      a first tamper-resistant device that stores a first key generation function, and
      a first storage unit that stores a first individual information; and
   a second cryptographic communication apparatus including:
      a second tamper-resistant device that stores a second key generation function, and
      a second storage unit that stores a second individual information, wherein
   the first cryptographic communication apparatus generates a first shared key using the first key generation function and the second individual information, and
   the second cryptographic communication apparatus generates a second shared key using the second key generation function and the first individual information.

2. The cryptographic communication system according to claim 1, wherein
   the first tamper-resistant device stores the first shared key, and
   the second tamper-resistant device stores the second shared key.

3. The cryptographic communication system according to claim 1, wherein
   the first cryptographic communication apparatus generates a first authenticator using the first shared key and the first individual information and transmits the first authenticator to the second cryptographic communication apparatus,
   the second cryptographic communication apparatus decrypts the first authenticator received from the first cryptographic communication apparatus using the second shared key, and
   the second cryptographic communication apparatus performs authentication of the first cryptographic communication apparatus based on a result obtained by decrypting the first authenticator.

4. The cryptographic communication system according to claim 1, wherein
   the second cryptographic communication apparatus generates a second authenticator using the second shared key and the second individual information and transmits the second authenticator to the first cryptographic communication apparatus,
   the first cryptographic communication apparatus decrypts the second authenticator received from the second cryptographic communication apparatus using the first shared key, and
   the first cryptographic communication apparatus performs authentication of the second cryptographic communication apparatus based on a result obtained by decrypting the second authenticator.

5. A cryptographic communication method by a first cryptographic communication apparatus and a second cryptographic communication apparatus, the first cryptographic communication apparatus that includes a first tamper-resistant device storing a first key generation function and a first storage unit storing a first individual information, the second cryptographic communication apparatus that includes a second tamper-resistant device storing a second key generation function and a second storage unit storing a second individual information, the cryptographic communication method comprising:
   generating a first shared key using the first key generation function and the second individual information; and
   generating a second shared key using the second key generation function and the first individual information.

6. A cryptographic communication apparatus comprising a first tamper-resistant device that stores a first key generation function and a first storage unit that stores a first individual information, the cryptographic communication apparatus acquiring, from another cryptographic communication apparatus including a second tamper-resistant device that stores a second key generation function and a second storage unit that stores a second individual information, the second individual information, and the cryptographic communication apparatus generating a shared key using the second individual information and the first key generation function.

* * * * *